(12) United States Patent
Herren et al.

(10) Patent No.: US 6,795,260 B2
(45) Date of Patent: Sep. 21, 2004

(54) OPTICAL UNIT AND ITS USE

(75) Inventors: Andreas Herren, Benglen (CH); Saverio Sanvido, Zurich (CH); Christian Meisinger, Zurich (CH); Peter Adolph, Basel (CH)

(73) Assignee: Contraves Space AG, Zurich (CH)

( * ) Notice: Subject to any disclaimer, the term of this patent is extended or adjusted under 35 U.S.C. 154(b) by 0 days.

(21) Appl. No.: 10/253,398

(22) Filed: Sep. 23, 2002

(65) Prior Publication Data
US 2003/0086193 A1 May 8, 2003

Related U.S. Application Data

(63) Continuation-in-part of application No. 09/733,710, filed on Dec. 8, 2000, now abandoned.

(30) Foreign Application Priority Data

Dec. 9, 1999 (CH) .............................................. 2269/99

(51) Int. Cl.[7] .......................... G02B 27/00; G02B 7/02; G02B 5/08
(52) U.S. Cl. ....................... 359/894; 359/819; 359/820; 359/846
(58) Field of Search ................................ 359/894, 811, 359/819, 391, 395, 507, 512, 822, 823; 372/107, 92; 353/101

(56) References Cited

U.S. PATENT DOCUMENTS

| | | | |
|---|---|---|---|
| 4,218,114 A | 8/1980 | Bunch | |
| 4,484,798 A | 11/1984 | Howden | |
| 4,669,842 A | * 6/1987 | Yomoda et al. | 353/101 |
| 4,776,684 A | 10/1988 | Schmidt-Kaler | |
| 5,035,495 A | 7/1991 | Toyoda et al. | |
| 5,233,382 A | * 8/1993 | Taniguchi et al. | 396/113 |
| 5,313,333 A | * 5/1994 | O'Brien et al. | 359/811 |
| 5,760,979 A | 6/1998 | Saito | |
| 5,825,565 A | 10/1998 | Papenburg et al. | |
| 5,848,092 A | * 12/1998 | Mitsumoto et al. | 372/107 |
| 5,864,739 A | 1/1999 | Kaneko et al. | |
| 6,114,671 A | * 9/2000 | Wehner et al. | 219/497 |

FOREIGN PATENT DOCUMENTS

| | | |
|---|---|---|
| CH | 545 976 | 2/1974 |
| DE | 39 40 924 A1 | 6/1991 |
| EP | 0 192 271 A3 | 8/1986 |
| EP | 0 192 271 A2 | 8/1986 |
| EP | 0 779 503 A2 | 11/1996 |
| FR | 2 770 308 A1 | 10/1997 |

* cited by examiner

*Primary Examiner*—Andrey Chang
(74) *Attorney, Agent, or Firm*—William Michael Hynes; Townsend and Townsend and Crew LLP

(57) ABSTRACT

An optical unit (10) comprising a plurality of optical elements, a receiving structure (12) with a plurality of element supports (40, 41) for receiving the optical elements. The element supports (40, 41) are in the form of a plate or shell or tube, whose dimensions are greater than the dimensions of the optical elements to be received, and is connected to another element support. At least one element support (40, 41) comprises temperature elements (43–49) that can be heated and/or cooled. The optical unit (10) furthermore comprises a control unit for driving the temperature elements (43–49) in order to locally change the temperature of the at least one element support (40, 41) so as to influence in a controlled manner the shape of the at least one element support (40, 41).

20 Claims, 5 Drawing Sheets

OPTICAL UNIT AND ITS USE

CROSS-REFERENCES TO RELATED APPLICATIONS

This Application is a Continuation-In-Part of and claims priority from Swiss Application No. 1999 2269/99, filed Dec. 9, 1999 and from U.S. patent application Ser. No. 09/733,710 filed Dec. 8, 2000 now abandoned.

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

This invention relates to an optical unit comprising several optical elements and a support structure with element supports for receiving the optical elements. The invention furthermore relates to the use of the optical unit.

BACKGROUND OF THE INVENTION

Within the scope of the present specification, the term "optical unit" is intended to mean units with optical elements, such as mirrors and lenses, i.e. reflecting telescopes, for example, and in particular, but not exclusively, so-called skewed reflectors, i.e. reflector telescopes whose mirrors are not arranged coaxially.

Demands for accuracy made on optical units are generally comparatively great. Particular demands are made on optical units which are parts of apparatus used in space. These not only need to meet extensive requirements made on accuracy, but also compatibility requirements demanded in space, which makes achieving great accuracy difficult. In particular, the mass of the optical unit must be as low as possible. Moreover, the optical unit and its fastening on the apparatus must be embodied to be such that its transport into space, which usually takes place by means of a rocket and involves high static loads and vibrations, can be tolerated without damage. Finally, the optical unit and its fastening on the apparatus must be laid out in such a way that the large temperature differences occurring in space, and the steep temperature gradients caused by these temperature differences, have no negative effects on the apparatus and the optical unit. It is possible here for the extremes of temperature to lie far outside the range of customary ambient temperatures.

Up to now, essentially two types of optical units have been known for use in space. With the first type, the optical elements are coaxially arranged and the receiving structure is in the approximate shape of a tube, if necessary with branches, and the optical elements, i.e. the mirror or lens arrangements, are received in this tube, or are enclosed in a dynamically balanced manner by this tube, or the branches of the tube. With the second type, the optical elements are not coaxially arranged, the receiving structure essentially is in the shape of a closed box and the optical elements are fastened to surfaces of this box. The disadvantage of the tube-like, as well as the box-like receiving structures is essentially seen to lie in that they are too heavy. In general, they have a wall thickness which is the same all over and is designed for that element support, which is subjected to the greatest stress, as a result of which the receiving structure for the areas of other, less stressed element supports, is too large. Moreover, the tube-like, as well as the box-like receiving structures are disadvantageous in view of thermal stresses, since they essentially form a closed envelope.

A further disadvantage of the previously known optical units lies in that temperature differences have a negative effect on the precision of the position of optical elements in respect to each other, as well as on the durability of their connection with each other.

BRIEF SUMMARY OF THE INVENTION

It is therefore the object of the invention to provide an optical unit of the type mentioned at the outset, by means of which the disadvantages of the prior art structures can be avoided, propose an optical unit of the type mentioned at the outset, which avoids the problem of heat expansion and to propose a use of the novel optical units in space.

As mentioned, the element support may be fastened on other parts of the receiving structure only along a portion of its rim. This portion can be continuous, so that the element support is fastened in a cantilevered manner, so to speak, or it can consist of a few, for example two, partial areas.

Many advantages can be achieved by the novel embodiment of the receiving structure of the optical unit, and the most important ones of these will be listed in what follows.

Essentially, material is only employed where it is actually needed for reasons of the dimensions of the optical elements. By means of this it is possible to decrease the mass of the receiving structure, and the energy requirements for transporting the apparatus to which the optical unit is attached is thus reduced.

Because of the embodiment of the receiving structure, or the lack of an envelope for the optical unit, their moments of inertia are also reduced, which has the result that the output requirements for tracking by the optical unit are also minimized. If, on the other hand, a defined amount of energy for tracking by the optical unit is provided, the bandwidth of the tracking can be increased, for example.

Moreover, disadvantageous effects of the large temperature differences and temperature gradients can be eliminated or at least reduced to a large degree by means of the temperature elements and the control unit.

Additional element supports can then be embodied similar to the known receiving structures as closed element supports in a tube- or box-shape. Such receiving structures can then be called complex receiving structures.

The element supports are preferably dimensioned not only to match the dimensions and masses of the optical element to be received, but generally to match the stresses to be absorbed, in order to minimize the mass and moments of inertia of the support structure as much as possible.

It has been shown to be practical for this purpose to provide the individual element supports with mass-reducing cutouts, for example bores, and/or with reinforcing attachments, for example ribs, possibly also with beads for increasing stiffness.

The element supports of the novel optical unit can be produced individually and connected with each other by screwing, bolting, riveting, gluing, welding or soldering them together.

In another preferred embodiment of the novel optical unit the receiving structure can be integrally produced, for example, pressed, sintered, cut out of a block, or produced from bent and, if required, deep-drawn plate material.

Every optical element can be fastened directly in the associated element support, for example by cementing or gluing of its element rim to the rim of a recess in the element support intended for receiving the element. It is also possible to provide a suspension for the optical elements.

The characteristics of the first and second embodiment variation of the invention can be combined, from which an optical unit results which in every way is particularly advantageous in mechanical and thermal respects.

Although the optical units in accordance with the invention had been specially conceived for use in space, they can also be employed in other ways. When using the optical units as components of an apparatus in space, the receiving structure is advantageously fastened at least nearly isostatically on the apparatus.

Further properties and advantages of the invention will be extensively described in what follows by means of the description and with reference to the drawings.

DETAILED DESCRIPTION OF THE INVENTION

Figure 1:
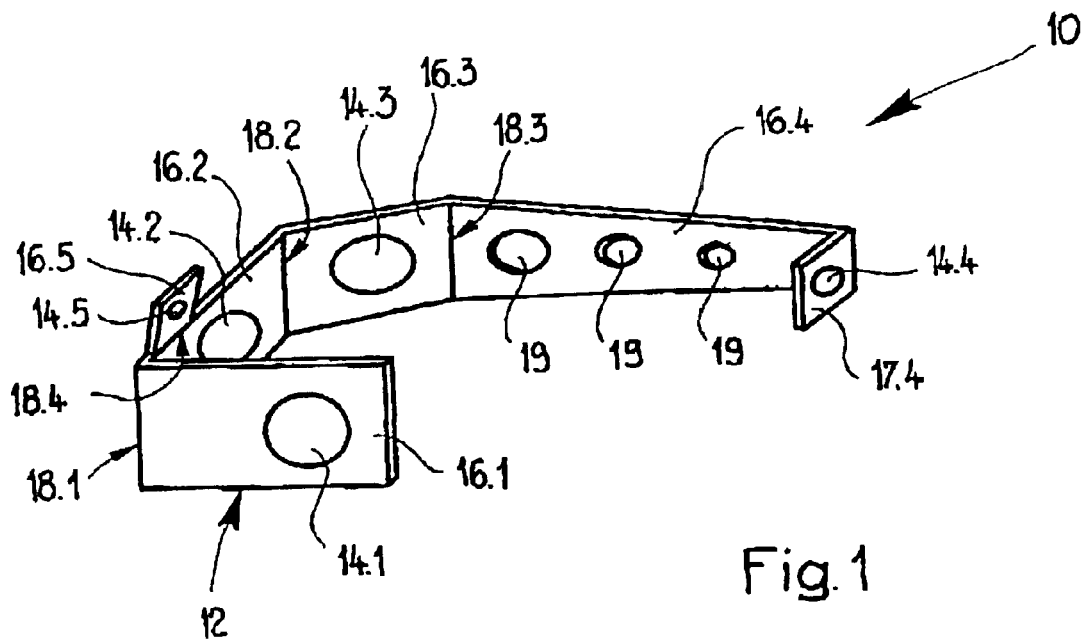
FIG. 1 is a diagram of a first optical unit in accordance with the invention.

FIG. 1 represents a first optical unit 10, whose receiving structure 12 has a very low mass. The optical unit 10 contains five optical elements 14.1, 14.2, 14.3, 14.4, 14.5. Each optical element 14.1 to 14.5 is fastened in an element support 16.1, or 16.2, or 16.3, or 16.4, or 16.5. The three element supports 16.1, 16.2 and 16.3 are constituted by plates connected with each other, or by an appropriately bent plate, wherein the element support 16.2 is connected by one of its rim edges 18.1 with the element support 16.1, and at the oppositely located rim edge 18.2 with the element support 16.3. The element support 16.3 is connected with the element support 16.4 at the rim edge 18.3 located opposite the rim edge 18.2. On its outer end, the element support 16.4 has an end element 17.4 oriented transversely to its longitudinal direction, in which the optical element 14.4 is received. The element support 16.5 is connected along the rim edge 18.4 with the element support 16.2. All remaining rim edges of the element supports 16.1 to 16.5 are free. The element support 14.4 has several mass-reducing cutouts 19. The receiving structure 12 of this optical unit 10 is open and produced in ultralight construction. The plate(s) can be provided with beads for increasing the flexural strength.

Figure 2:
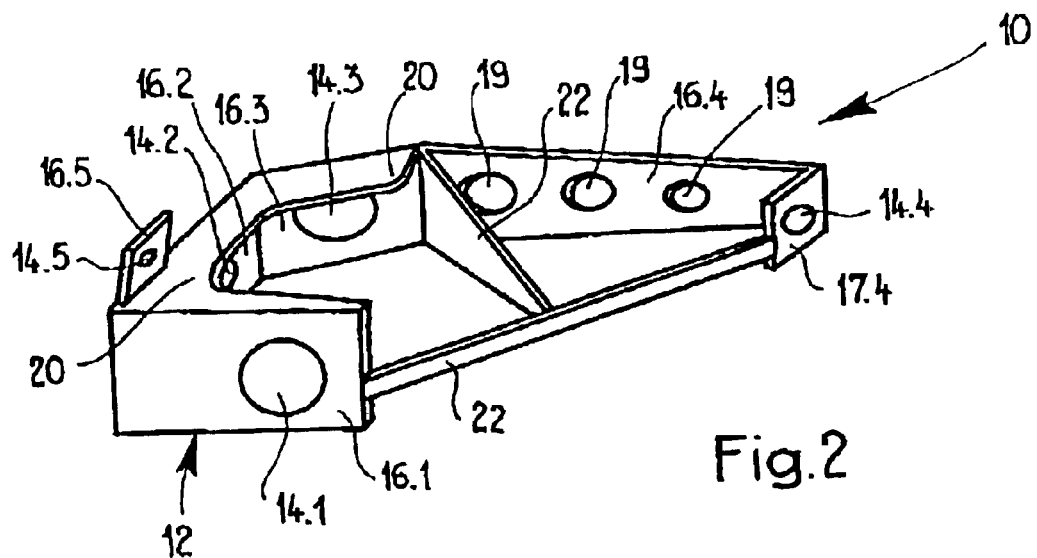
FIG. 2 shows a second optical unit in accordance with the invention in the same representation as in FIG. 1.

A further optical unit 10 is represented in FIG. 2, which has the same optical elements 14.1 to 14.5 as the optical unit represented in FIG. 1. But here the receiving structure 12 is more resistant to deformations of the individual element supports 14.1 to 14.3, or twisting of the entire receiving structure 12, thanks to reinforcement ribs 20 on the element supports 16.1 to 16.3, and thanks to additional stiffening struts 22. But this advantage has to be paid for by the disadvantage of greater mass of the optical unit. The receiving structure 12 of this optical unit is also open.

Figure 3:
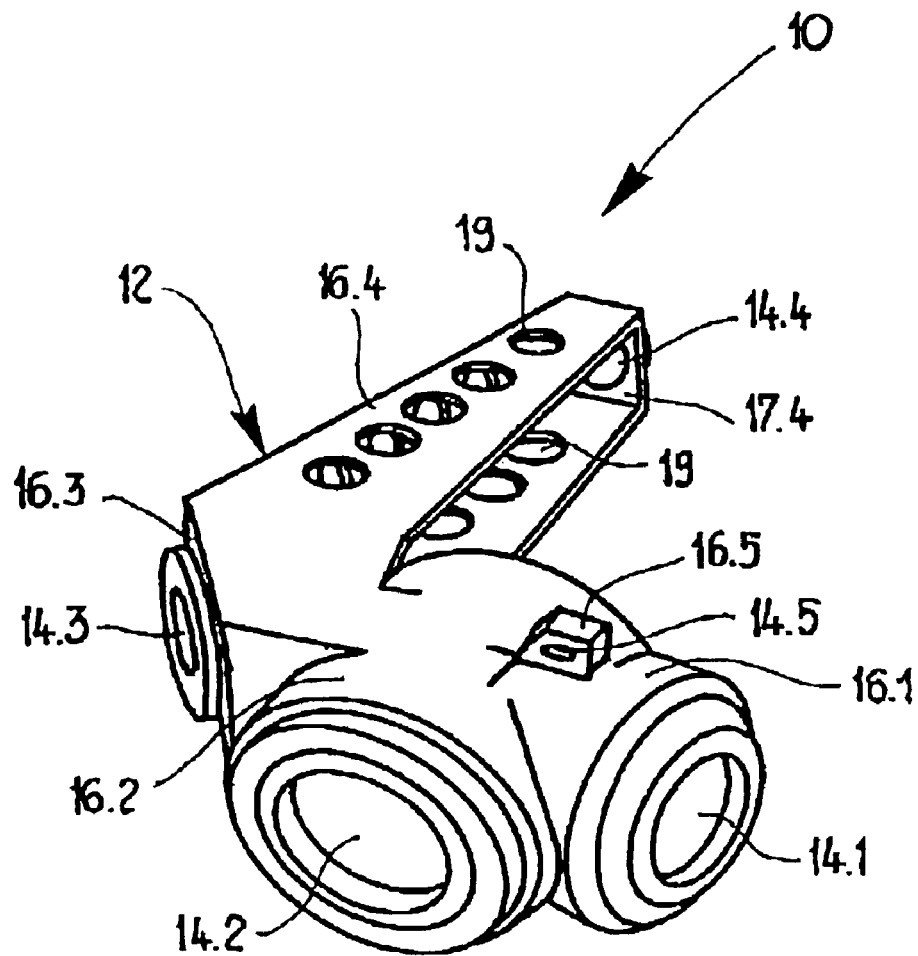
FIG. 3 shows a second optical unit in accordance with the invention in the same representation as in FIG. 1 and FIG. 2.

FIG. 3 shows a still further optical unit 10, again with the same optical elements 14.1 to 14.5. The receiving structure 12 of this optical unit 10 is complex, i.e. on the one hand it comprises support elements such as the open receiving structures in the form of linear supports or plates or shells, and on the other hand support elements in the form of tubes. The element supports 16.3 and 16.5 are designed essentially the same as in the optical units represented in FIGS. 1 and 2. Except for a transverse element 17.4, the element support 16.4 consists essentially of three linear supports, which are put together in such a way that they form a U-shaped channel, which is open in the linear direction of the element support. Here, the element supports 14.1 and 14.2 are embodied to be closed, namely in the form of tubes.

Figure 4:
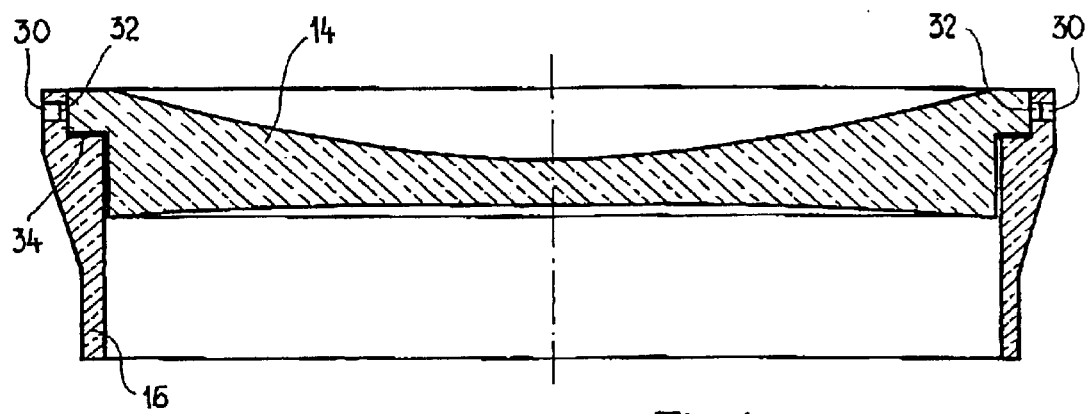
FIG. 4 is a sectional view of a first embodiment of an optical element fastened in an element support, FIG. 5 also is a sectional view of a second embodiment of an optical element fastened in an element support.
Figure 5:
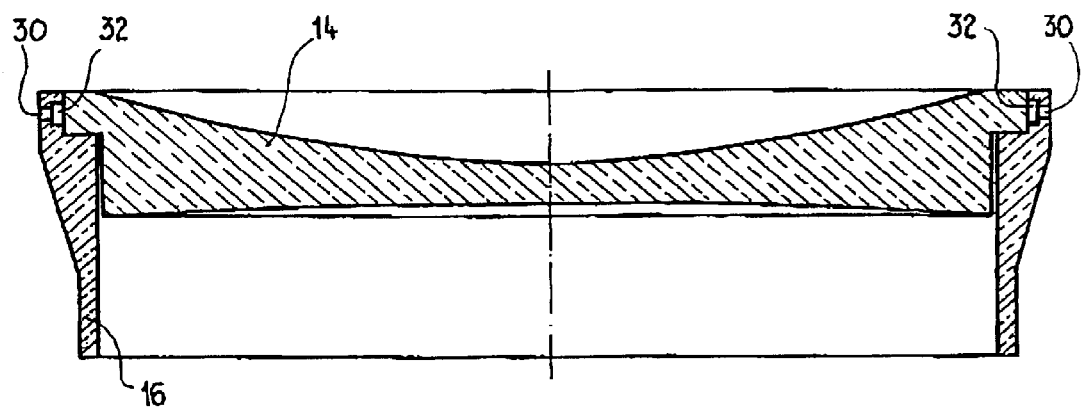
FIG. 5A shows a detail from FIG. 5.

An optical element 14 fastened in an element support 16 is represented in each one of FIGS. 4 and 5. The element support 16 preferably consists of two half shells. The optical element 14 is made of glass-ceramic material for example. The element support 16 has at least one injection bore 30, however, at least two injection bores are advantageously provided. The inner end of these injection bores terminates in a circumferential groove 32, so that an annularly circulating hollow space between the element support 16 and the optical element 14 is formed by this. A suitable adhesive, or cement, is pressed into the circumferential groove 32 through at least one of the injection bores 30 until the entire circumferential groove 32 has been filled.

FIG. 4 shows an exemplary embodiment wherein the exact arrangement of the optical element 14 has been achieved by the insertion of spacers 34, so-called shims.

Figure 5A:
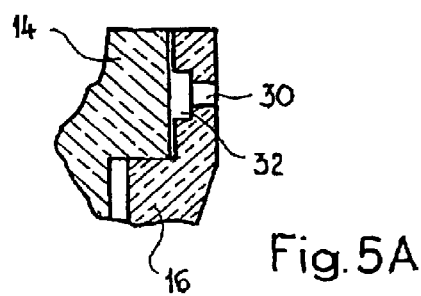

FIG. 5 shows an exemplary embodiment wherein the optical element 14 rests directly on a shoulder of the element support 16, wherein in accordance with FIG. 5A centering is provided.

Figure 6A:
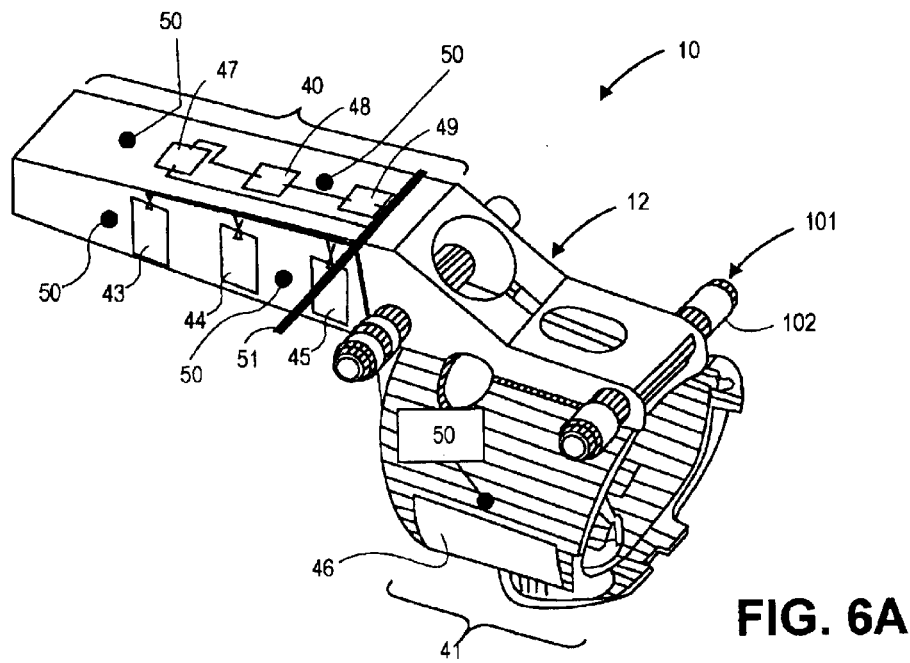
FIG. 6A shows a third optical unit in accordance with the invention.
Figure 6B:
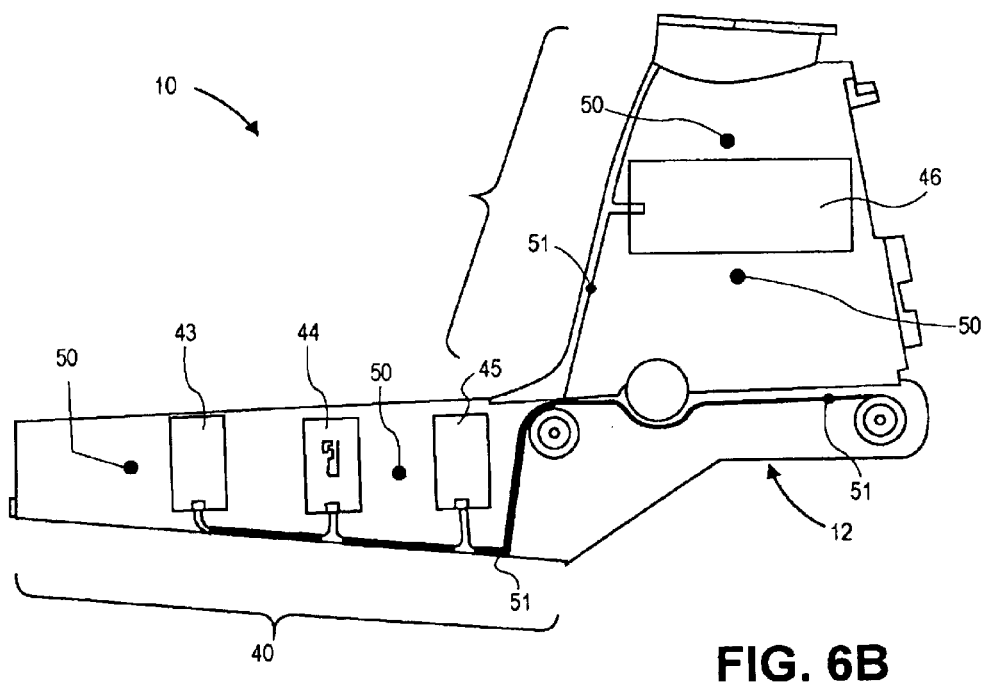
FIG. 6B shows a side view of the optical unit of FIG. 6A.

FIG. 6A and FIG. 6B show a further receiving structure 12 being part of an optical unit 10, according to the present invention. The optical elements are not visible in FIG. 6A and 6B. The receiving structure 12 of this optical unit 10 is complex, i.e. on the one hand it comprises element supports such as a receiving structure in the form of linear element support 40, and on the other hand an element support 41 in the form of a tube. The element supports 40 and 41 may designed essentially the same as in the optical unit represented in FIG. 3. The element support 40 forms essentially a linear channel for a light beam. The element support 40 basically has a rectangular cross-section. The element support 41 has the shape of a tube. In the present embodiment, the receiving structure 12 comprises two element supports 40 and 41. The element support 40 comprises plates serving a sidewalls and the element support 41 comprises a sidewall that is tube-shaped. The dimensions of the element supports 40 and 41 are greater than the dimensions of the optical elements to be received. The element support 40 is connected to the element support 41, as illustrated in FIGS. 6A and 6B.

In the present embodiment, both element supports 40 and 41 comprise temperature elements 43–49 that can be heated and/or cooled. These temperature elements 43–49 are fixed to the respective element support 40 or 41. Cables 51 are connected to the temperature elements 43–49 allowing the elements to be heated and/or cooled. The optical unit 10 furthermore comprises a control unit, not depicted in FIGS. 6A and 6B, for driving the temperature elements 43–49 in order to locally change the temperature of the element supports 40 and 41 so as to influence in a controlled manner the shape of the element supports 40 and 41.

According to the present invention, preferably a material is used for the optical elements that has a low coefficient of expansion. The receiving structure 12 or at least the element supports of the different embodiments depicted in the FIGS. 1, 2, 3 and 6A, 6B comprise a material that has a substantial temperature coefficient. That is, the temperature coefficient of the element supports is larger than the temperature coefficient of the optical elements. As mentioned above. The optical unit or at least one element support thereof is equipped with temperature elements, which allow to change the temperature of the respective element support. These temperature elements may be heaters for example. It is also possible to employ peltier elements which allow the element support to be cooled and/or heated. Heaters allow the temperature of the element support to be locally increased above the ambient temperature. When employing peltier elements, for instance, the temperature can locally be decreased.

The structure of the optical unit as a result of the non-negligible coefficient of thermal expansion will distort from its original shape according to the change of the temperature distribution. This distortion is used to actively compensate alignment errors of the optical elements. Furthermore, one can compensate optical errors which may occur during assembly of the optical unit, or during its integration. It is also possible to provide for a compensation during operation, e.g. while the optical unit is employed in space.

According to the present invention there are two ways to operate such an optical unit:

1. Assuming that all optical errors are introduced during assembly and possibly integration, the optical parameters are measured before operation and the appropriate temperature distribution for the correct performance is derived. During operation of the optical unit it is thus only necessary to measure the temperature distribution within the structure within sufficient accuracy and then to apply the necessary power (current and voltage) to the temperature elements required to maintain the correct temperature.

2. Under the assumption that the optical errors may also occur during operation, it is proposed to monitor the optical performance during operation and to optimize it by appropriately controlling the temperature elements. The monitoring of the optical performance may be done in different ways, depending on the kind of optical unit. One may for example measure the intensity of a light beam received by a lens or mirror of the optical unit, or the contrast, or the wavefront may be determined as well. It is also possible to determine the wavefront error or to base any corrections on a transmission error.

In some case it is sufficient to install temperature sensors 50 that provide input signals for the optical unit's control unit. Several such temperature sensors 50 are depicted in FIGS. 6A and 6B as black dots.

Figure 7:
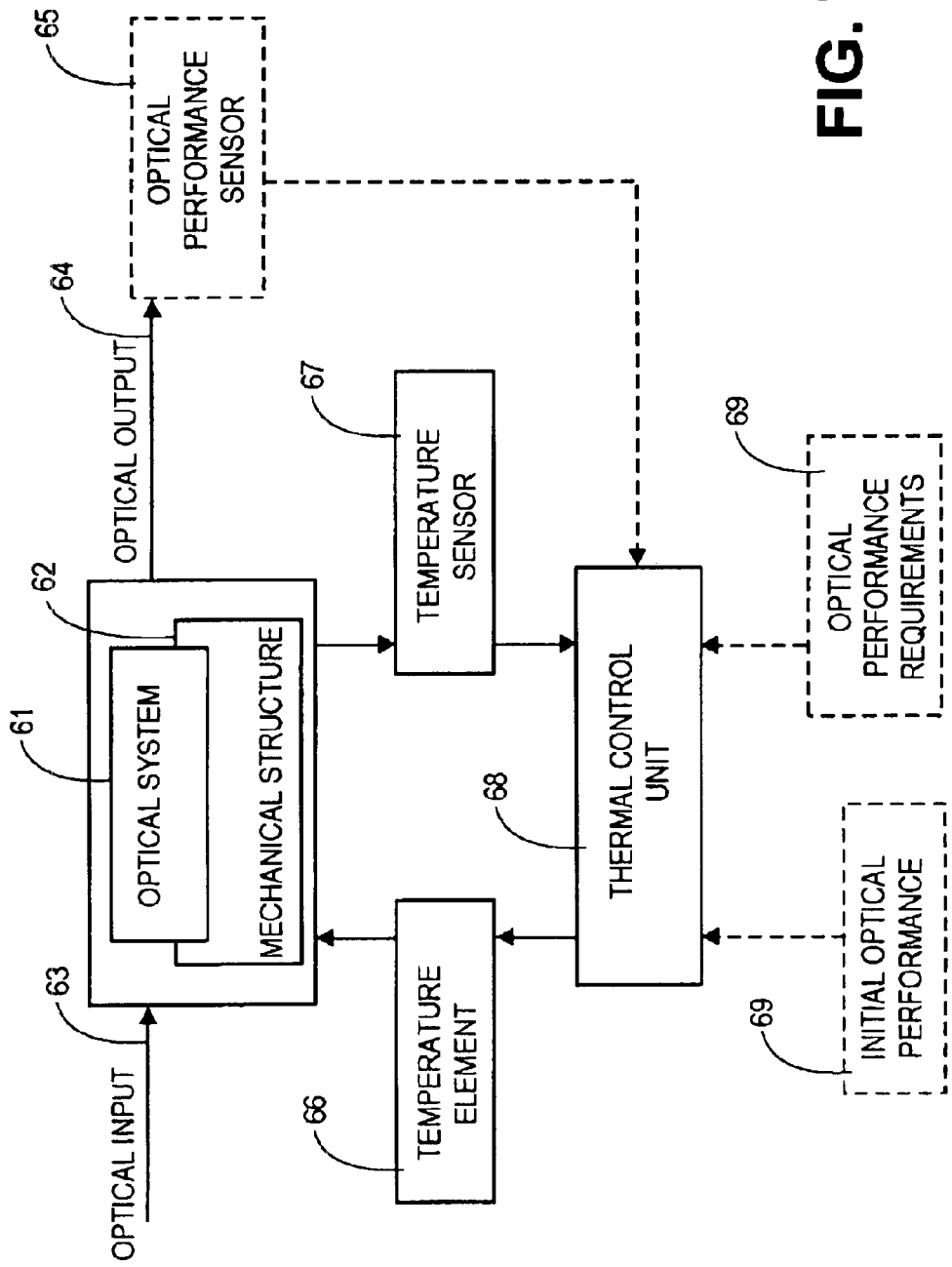
FIG. 7 is a block diagram, according to the present invention.

A block diagram of an optical unit 60 with control unit is given in FIG. 7. The optical unit 60 comprises an optical system 61 with a plurality of optical elements (e.g., lenses, mirrors, gratings, prisms, etc.). The optical elements are fixed or carried by a mechanical structure 62. The receiving structure with a plurality of element supports is part of the mechanical structure 62. An optical signal, e.g., a laser beam, is coupled into the optical system 61, as indicated by the arrow 63. At the output side 64, an optical output signal is provided. As mentioned, the optical unit comprises at least one temperature sensor 67. This sensor 67 is connected to a thermal control unit 68. In the most basic embodiment, the optical unit comprises at least one temperature element 66, that is connected to the thermal control unit 68. Based on the input signals received from the temperature sensor 67, the thermal control unit 68 decides whether and how to drive the temperature element 66. If no correction is needed, no current flows through the temperature element 66. If corrective action is required, the thermal control unit 68 applies the appropriate current to the temperature element.

In a more complex embodiment (indicated in FIG. 7 by means of dashed lines and boxes), the optical performance is used to improve the system stability. This can be done by a special sensor, referred to as optical performance sensor 65, that is optically coupled to the light path. Preferably, the optical performance sensor 65 is located at the output 64. The optical performance sensor 65 provides error signals (cf. the dashed arrow) to the thermal control unit 68. There is a database 69 or table providing optical performance requirements. In the present embodiment, these performance requirements are compared with the actual performance and the thermal control unit 68 is enabled to make decisions based on the deviations. If the actual optical performance is reduced, the thermal control unit 68 drives the temperature element 66 so that the performance increases again. Preferably, values are stored that represent the initial optical performance. These values can be determined after assembly and integration for example. They characterize the best possible alignment.

In a preferred embodiment, the temperature sensors are bonded to the element support between two thumbnail-sized patches of Kapton, for example.

According to the present invention, it is possible to influence in a controlled manner the shape of the at least one element support and thus to adjust the alignment of at least two optical elements of the optical unit.

What is claimed is:

1. An optical unit for employment is space comprising:
  a plurality of optical elements including at least two mirrors which are not coaxially arranged;
  a receiving structure with a plurality of element supports for receiving said optical elements wherein;
  the element supports have dimensions greater than the dimensions of the optical elements to be received, and each element support connected to another element support;
  at least one of the element supports comprising a linear element support in the form of a plate connected to another element support;
  the linear support in the form of a plate having at least one temperature elements that can be heated and/or cooled;
  an optical unit comprising a control unit for driving the temperature elements in order to locally change the temperature of the at least one linear element support so as to influence in a controlled manner the shape of the at least one linear element support and thereby compensate alignment of at least two mirrors which are not coaxially arranged;
  the optical unit further comprising at least a temperature sensor arranged to sense the temperature at said linear element support, the temperature sensor being enabled to provide input to the control unit; and, the control unit provides output signals to drive the temperature element, the output signals being determined by taking into consideration input signals of said at least one sensor.

2. The optical unit in accordance with claim 1, wherein: the temperature elements are heaters and/or peltier elements fixed to said linear element support and connected to cables conducting a current from the control unit.

3. The optical unit in accordance with claim 1, wherein: the element supports comprise a material that has a temperature coefficient being larger than the temperature coefficient of the mirrors.

4. The optical unit in accordance with claim 1, wherein: the element supports comprise a metal.

5. The optical unit in accordance with claim 1, further comprising:

additional means to determine reduction in optical performance due to misalignment of the mirrors, said means being enable to provide performance error signals to said control unit;

the control unit store values that represent the initial optical performance; and, the control unit outputs signals responsive to optical performance compared to initial optical performance.

6. The optical unit in accordance with claim 1, wherein at least one mirror is fastened directly in the associated element support.

7. The optical unit in accordance with claim 6, wherein at least one mirror is fastened directly in the associated element support by gluing.

8. The optical unit in accordance with claim 1, said receiving structure further comprising at least one shell shaped element support in the form of a shell or tube whose dimensions are greater than the dimensions of the mirror to be received, the shell-shaped element support comprises at least one temperature element that can be heated and/or cooled and at least one temperature sensor arranged at or close to said shell-shaped element support.

9. The optical unit in accordance with claim 8, wherein said shell-shaped element support consists of two half shells or a tube, and having additional means to determine a reduction in optical performance due to misalignment of the mirrors, said means being enable to provide performance error signals to said control unit.

10. The optical unit in accordance with claim 8, comprising three linear element supports which are put together in such a way that they form a U-shaped linear channel, which is open in the linear direction of the element support, one end of the linear channel is connected to a transverse support receiving a mirror and the other end of said linear channel is connected to at least one shell-shaped support, element, and the side-walls of said linear channel are provided with sensors and temperature heaters and/or coolers fixed on the surface of said linear element supports.

11. The optical unit in accordance with claim 10, wherein a first mirror is fastened in an end of said U-shaped linear channel portion and a second mirror is fastened in said element support in the form of a shell or tube.

12. The optical unit in accordance with claim 10, wherein said linear element support is provided with mass-reducing cutouts and/or with reinforcing attachments for increasing stiffness.

13. The optical unit in accordance with claim 10, wherein the element supports are produced individually and then connected together.

14. The optical unit in accordance with claim 10, wherein the element supports are portions of a receiving structure which is integrally produced.

15. The optical unit in accordance with claim 10, wherein in the control unit values are stored that represent the initial optical performance.

16. The optical unit in accordance with claim 10, wherein a removable protective device for the mirrors is provided for protecting them during transport into space.

17. The optical unit in accordance with claim 8, further comprising heaters and/or coolers with a surface fixed to the surface of said shell-shaped support.

18. The optical unit in accordance with claim 17, further comprising fixation elements for integrating said optical unit in an apparatus for employment in space, wherein said fixation elements are also provided with heaters fixed peripherally on said fixation elements.

19. The optical unit in accordance with claim 8, wherein the receiving structure is constituted by simply connected bodies in the manner of linear supports, plates or shells, whose dimensions are matched to the dimensions of the mirrors to be received, wherein each element support is free along a part of its rim in order to embody the support structure to be open.

20. The optical unit in accordance with claim 8, wherein the control unit together with temperature elements allows temperature difference occurring in space to be actively compensated.

* * * * *